(12) United States Patent
Kawahara

(10) Patent No.: US 10,760,644 B2
(45) Date of Patent: Sep. 1, 2020

(54) DYNAMIC VIBRATION ABSORBER

(71) Applicant: EXEDY Corporation, Neyagawa-shi, Osaka (JP)

(72) Inventor: Yuki Kawahara, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/084,950

(22) PCT Filed: Jun. 5, 2017

(86) PCT No.: PCT/JP2017/020874
§ 371 (c)(1),
(2) Date: Sep. 13, 2018

(87) PCT Pub. No.: WO2018/016211
PCT Pub. Date: Jan. 25, 2018

(65) Prior Publication Data
US 2019/0072154 A1 Mar. 7, 2019

(30) Foreign Application Priority Data

Jul. 19, 2016 (JP) .................. 2016-141586

(51) Int. Cl.
*F16D 3/12* (2006.01)
*F16F 15/14* (2006.01)
(Continued)

(52) U.S. Cl.
CPC .............. *F16F 15/145* (2013.01); *F16D 3/12* (2013.01); *F16D 7/06* (2013.01); *F16F 15/1397* (2013.01); *F16F 15/173* (2013.01)

(58) Field of Classification Search
CPC ........ F16F 15/145; F16F 15/173; F16F 15/14; F16D 7/06; F16D 3/12; F16H 3/663
See application file for complete search history.

(56) References Cited

U.S. PATENT DOCUMENTS 5,513,731 A * 5/1996 Matsuoka ............... F16H 45/02
192/208
6,280,330 B1 * 8/2001 Eckel ................ F16F 15/13142
464/3

(Continued)

FOREIGN PATENT DOCUMENTS

CN       104781580 A       7/2015
DE   102014220404 A1       4/2016
(Continued)

OTHER PUBLICATIONS

International Search Report dated Aug. 22, 2017 for corresponding foreign Application No. PCT/JP2017/020874 pp. 2.
(Continued)

*Primary Examiner* — David J Hlavka
(74) *Attorney, Agent, or Firm* — United IP Counselors, LLC

(57) ABSTRACT

A dynamic vibration absorber is configured to be attached to a rotary member. The dynamic vibration absorber includes a base member, a mass body, and a torque limiting part. The base member is rotatably disposed. The mass body is attached to the base member so as to be rotatable relatively thereto. The torque limiting part limits transmission of a torque to be inputted into the base member from the rotary member.

6 Claims, 13 Drawing Sheets

(51) Int. Cl.
*F16F 15/173* (2006.01)
*F16F 15/139* (2006.01)
*F16D 7/06* (2006.01)

(56) References Cited

U.S. PATENT DOCUMENTS

| | | | | |
|---|---|---|---|---|
| 6,382,050 | B1* | 5/2002 | Carlson | F16F 15/145 |
| | | | | 464/24 |
| 9,435,397 | B2* | 9/2016 | Aijima | F16F 15/145 |
| 2010/0236228 | A1* | 9/2010 | Degler | F16F 15/145 |
| | | | | 60/338 |
| 2013/0116054 | A1* | 5/2013 | Amano | F16F 15/129 |
| | | | | 464/45 |
| 2014/0066216 | A1* | 3/2014 | Tone | F16D 3/12 |
| | | | | 464/160 |
| 2014/0182993 | A1 | 7/2014 | Rusch et al. | |
| 2014/0221105 | A1 | 8/2014 | Jimbo et al. | |
| 2014/0221106 | A1 | 8/2014 | Jimbo et al. | |
| 2015/0167779 | A1 | 6/2015 | Ulbrich et al. | |
| 2015/0316125 | A1 | 11/2015 | Maienschein | |

FOREIGN PATENT DOCUMENTS

| | | |
|---|---|---|
| EP | 1589256 B1 | 1/2008 |
| EP | 2685127 A1 | 1/2014 |
| EP | 2765330 A2 | 8/2014 |
| EP | 2765331 A2 | 8/2014 |
| JP | 2007-182986 A | 7/2007 |
| JP | 2007-247723 A | 9/2007 |
| JP | 2014-145413 A | 8/2014 |
| JP | 2014-152834 A | 8/2014 |
| JP | 2014-152835 A | 8/2014 |
| JP | 2014-206244 A | 10/2014 |
| JP | 2017-82819 A | 5/2017 |
| WO | 2012/124014 A1 | 9/2012 |
| WO | 2017/029931 A1 | 2/2017 |
| WO | 2017/029932 A1 | 2/2017 |
| WO | 2017/029939 A1 | 2/2017 |
| WO | 2017/029940 A1 | 2/2017 |

OTHER PUBLICATIONS

Office Action(Notification of Reasons for Refusal) of the corresponding Japanese Application No. 2016-141586, dated Dec. 10, 2019, 4 pp.

First Office Action of the corresponding Chinese Application No. 201780024111.8, dated Feb. 3, 2020, 7 pp.

2nd Office Action of the corresponding Japanese Application No. 2016-141586, dated Jul. 21, 2020, 4 pp.

* cited by examiner

DYNAMIC VIBRATION ABSORBER

CROSS-REFERENCE TO RELATED APPLICATIONS

This application is the U.S. National Phase of PCT International Application No. PCT/JP2017/020874, filed on Jun. 5, 2017. That application claims priority to Japanese Patent Application No. 2016-141586, filed Jul. 19, 2016. The contents of both applications are herein incorporated by reference in their entirety.

TECHNICAL FIELD

The present disclosure relates to a dynamic vibration absorber.

BACKGROUND ART

For example, in automobiles, a damper device and so forth are installed between an engine and a transmission. The damper device includes an input member, an output member and elastic members. The input member is a member into which a torque from the engine is inputted. The output member outputs the torque, inputted into the input member, to the transmission. The elastic members elastically couple the input member and the output member. Fluctuations in velocity of rotation from the engine are inhibited by the damper device installed in a torque transmission path between the engine and the transmission.

BRIEF SUMMARY

Chances are that a dynamic vibration absorber is attached to a rotary member such as the aforementioned damper device so as to more appropriately inhibit fluctuations in rotational velocity. However, when an excessive torque is inputted into the rotary member due to sudden movement, sudden braking or so forth, the excessive torque is transmitted to the dynamic vibration absorber, and the rotary member and so forth are possibly damaged or broken by the inertia force of the dynamic vibration absorber.

It is an object of the present disclosure to provide a dynamic vibration absorber that is capable of preventing a rotary member from being damaged or broken even when an excessive torque is inputted into the rotary member.

Solution to Problems

A dynamic vibration absorber according to an aspect of the present disclosure is configured to be attached to a rotary member. The dynamic vibration absorber includes a base member, a mass body and a torque limiting part. The base member is rotatably disposed. The mass body is attached to the base member so as to be rotatable relatively thereto. The torque limiting part limits transmission of a torque to be inputted into the base member from the rotary member.

According to the configuration, the torque limiting part limits transmission of a torque to be inputted into the base member from the rotary member. Therefore, when an excessive torque is inputted into the rotary member, the torque limiting part does not transmit the torque to the base member. As a result, the dynamic vibration absorber can prevent the rotary member from being damaged or broken.

The torque limiting part can be configured to rotate the base member unitarily with the rotary member when the torque to be inputted into the base member is less than a threshold. Additionally, the torque limiting part can be configured to rotate the base member relatively to the rotary member when the torque to be inputted into the base member is greater than or equal to the threshold.

The torque limiting part can include an urging member that urges the base member toward the rotary member.

The dynamic vibration absorber can further include a housing and a viscous fluid. The housing is attached to the base member and accommodates the mass body. The viscous fluid is filled in the housing.

The mass body can sway with respect to the base member in a circumferential direction. A swaying center of the mass body can be arranged in a position different from a rotational center of the base member.

The dynamic vibration absorber can further include a centrifugal element and a cam mechanism. The centrifugal element is disposed to receive a centrifugal force that is generated by rotation of the base member. The cam mechanism converts the centrifugal force acting on the centrifugal element into a force directed in a circumferential direction.

According to the present disclosure, when an excessive torque is inputted into a rotary member, a dynamic vibration absorber can prevent the rotary member from being damaged or broken.

DETAILED DESCRIPTION OF EMBODIMENTS

An exemplary embodiment of a damper device including a dynamic vibration absorber according to the present disclosure will be explained with reference to drawings. It should be noted that in the following explanation, the term "axial direction" means an extending direction of a rotational axis O of a damper device 100. Additionally, the term "radial direction" means a radial direction of an imaginary circle about the rotational axis O. Moreover, the term "circumferential direction" means a circumferential direction of the imaginary circle about the rotational axis O.

[Damper Device]

Figure 1:
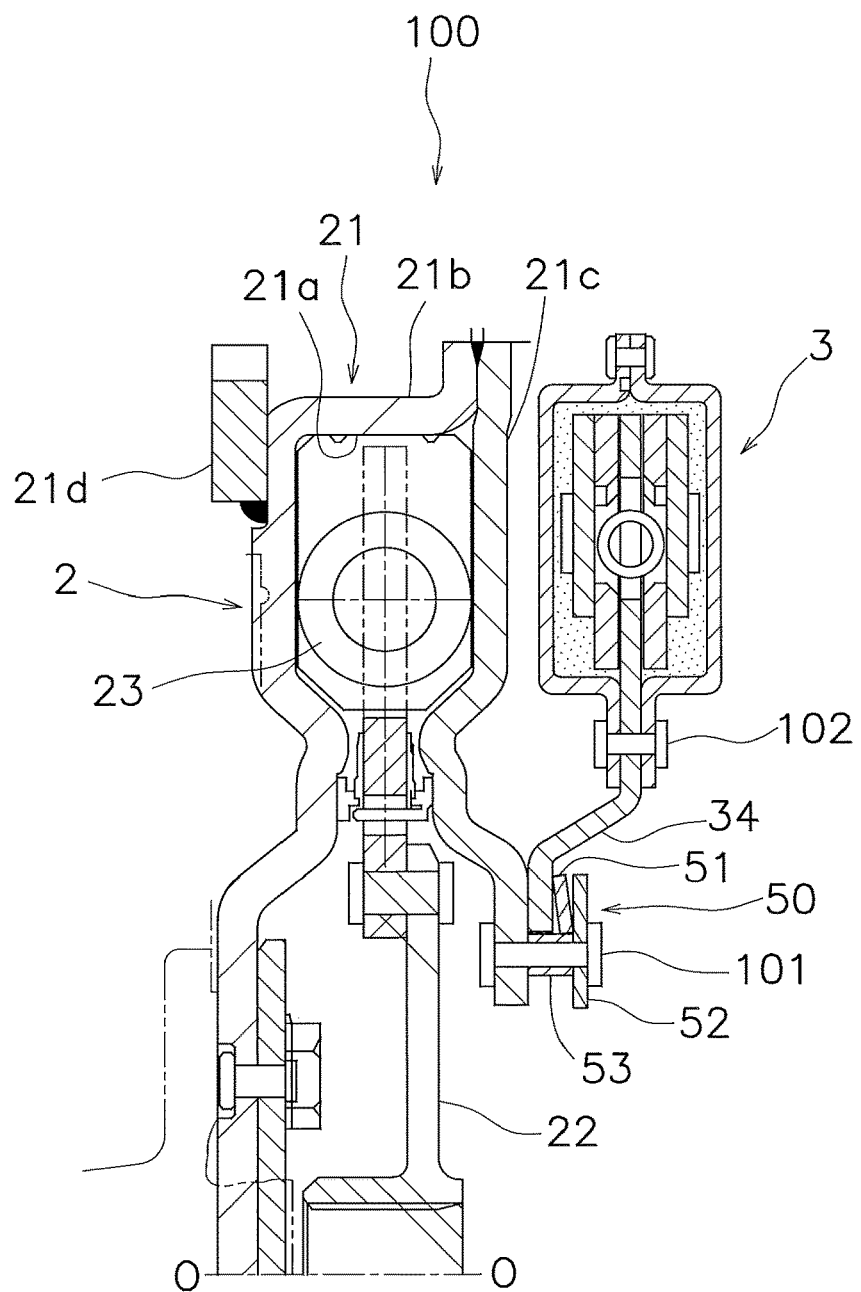
FIG. 1 is a cross-sectional side view of a damper device.

As shown in FIG. 1, the damper device 100 includes a damper device body 2 (an exemplary rotary member) and a dynamic vibration absorber 3. The damper device 100 is configured to transmit a torque from an engine and attenuate fluctuations in rotational velocity. The damper device 100 is disposed to be rotatable about the rotational axis O. The damper device 100 is a dry type damper device. In other words, the damper device 100 is disposed in a dry environment not filled with a viscous fluid. Additionally, an input member 21 (to be described) and an output member 22 (to be described) are rotated in the dry environment.

[Damper Device Body]

The damper device body 2 includes the input member 21 and the output member 22. The input member 21 is, for instance, a flywheel into which the torque from the engine is inputted. The input member 21 is fixed to a crankshaft of the engine.

The input member 21 has a disc shape. The input member 21 includes an accommodation space 21a. The accommodation space 21a extends in the circumferential direction. Elastic members 23 to be described are accommodated in the accommodation space 21a. Additionally, a viscous fluid can be filled in the accommodation space 21a. For example, grease can be filled in the accommodation space 21a.

The input member 21 includes an input plate 21b and an accommodation plate 21c. The accommodation space 21a is formed by the input plate 21b and the accommodation plate 21c. Additionally, the input member 21 includes a ring gear 21d. The ring gear 21d is fixed to the input plate 21b.

The output member 22 outputs the torque inputted into the input member 21. The output member 22 is coupled to the input member 21 so as to be rotatable relatively thereto. Detailedly, the damper device body 2 includes a plurality of elastic members 23. The elastic members 23 are, for instance, coil springs. The elastic members 23 elastically couple the input member 21 and the output member 22.

[Dynamic Vibration Absorber]

The dynamic vibration absorber 3 is attached to the damper device body 2. Detailedly, the dynamic vibration absorber 3 is attached to the input member 21 of the damper device body 2. The dynamic vibration absorber 3 is disposed in axial alignment with the damper device body 2. In other words, as seen in the axial direction, the dynamic vibration absorber 3 is disposed to overlap the damper device body 2.

Figure 2:
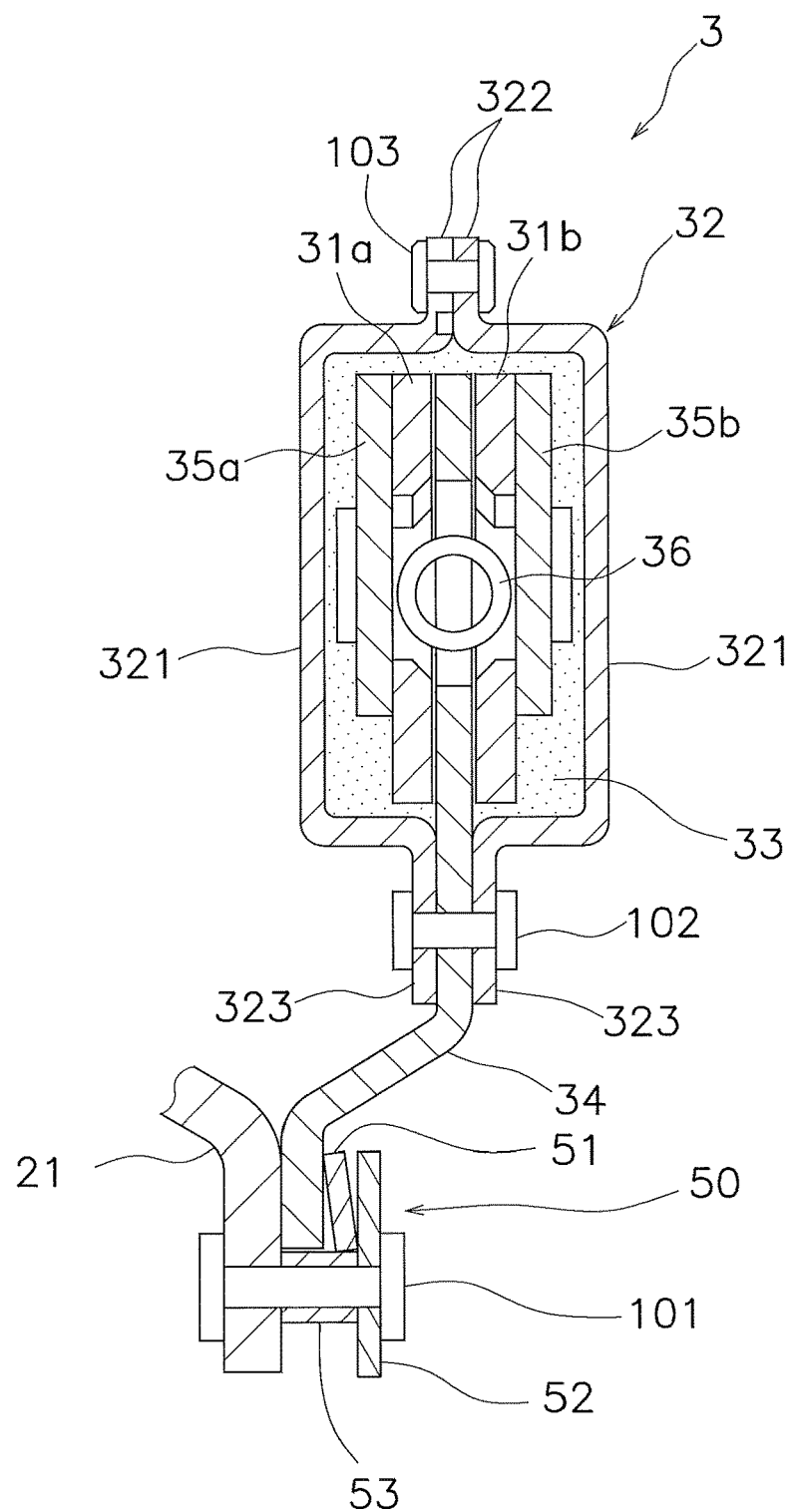
FIG. 2 is a cross-sectional side view of a dynamic vibration absorber.

The dynamic vibration absorber 3 is configured to attenuate vibration of the damper device body 2. As shown in FIG. 2, the dynamic vibration absorber 3 includes mass bodies 31a and 31b, a housing 32, a viscous fluid 33, a base member 34 and a torque limiting part 50. Additionally, the dynamic vibration absorber 3 includes a first lid member 35a, a second lid member 35b and a plurality of coil springs 36. It should be noted that in the present exemplary embodiment, a mass body is composed of the first mass body 31a and the second mass body 31b.

As shown in FIG. 1, the base member 34 is disposed to be rotatable about the rotational axis O. The base member 34 is attached to the damper device body 2 through the torque limiting part 50. Detailedly, the base member 34 is attached to the input member 21 of the damper device body 2 through the torque limiting part 50. When a torque to be inputted into the base member 34 from the damper device body 2 is less than a predetermined threshold, the base member 34 is unitarily rotated with the damper device body 2. Detailedly, when the torque to be inputted into the base member 34 from the input member 21 of the damper device body 2 is less than the predetermined threshold, the base member 34 is unitarily rotated with the input member 21 of the damper device body 2.

The base member 34 has an annular shape. The inner peripheral end of the base member 34 is attached to the damper device body 2 through the torque limiting part 50.

Figure 3:
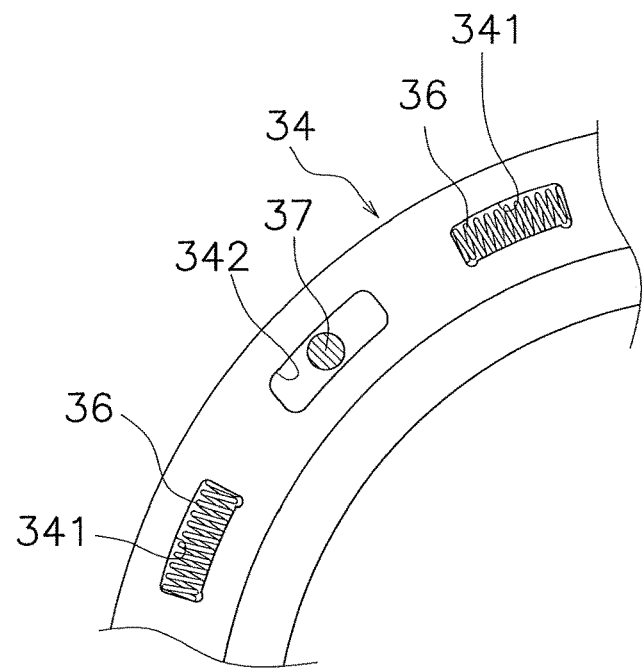
FIG. 3 is an enlarged front view of a base member.

As shown in FIG. 3, the base member 34 includes a plurality of accommodation parts 341. The respective accommodation parts 341 are disposed at intervals in the circumferential direction. The respective accommodation parts 341 extend in the circumferential direction. Elongated holes 342 are provided such that each is located between adjacent accommodation parts 341. The elongated holes 342 extend in the circumferential direction, and are disposed on the circumference of an imaginary circle on which the accommodation parts 341 are disposed.

As shown in FIG. 2, the torque limiting part 50 limits transmission of the torque to be inputted into the base member 34 from the input member 21 of the damper device body 2. Detailedly, when the torque to be inputted into the base member 34 is less than the predetermined threshold, the torque limiting part 50 rotates the base member 34 unitarily with the input member 21. In other words, the torque limiting part 50 transmits the torque from the input member 21 to the base member 34. On the other hand, when the torque to be inputted into the base member 34 is greater than or equal to the predetermined threshold, the torque limiting part 50 rotates the base member 34 relatively to the input member 21. In other words, the torque limiting part 50 does not transmit the torque from the input member 21 to the base member 34.

The torque limiting part 50 limits transmission of the torque to be inputted into the base member 34 from the damper device body 2 by a friction force. The torque limiting part 50 includes an urging member 51. The urging member 51 urges the base member 34 axially toward the input member 21. The urging member 51 makes contact with the inner peripheral end of the base member 34. The base member 34 is interposed and held between the input member 21 and the urging member 51.

When the torque to be inputted into the base member 34 is less than the predetermined threshold, the base member 34 is unitarily rotated with the input member 21 by a static friction force between the base member 34 and the input member 21. On the other hand, when the torque to be inputted into the base member 34 is greater than or equal to the predetermined threshold, a force exceeding the maximum static friction force acts on the base member 34, whereby the base member 34 is rotated relatively to the input member 21. It should be noted that a friction member can be interposed between the base member 34 and the input member 21.

The urging member 51 is, for instance, a disc spring. The outer peripheral end of the urging member 51 makes contact with the base member 34. On the other hand, the inner peripheral end of the urging member 51 makes contact with a support plate 52 to be described.

The torque limiting part 50 further includes the support plate 52. The support plate 52 supports the urging member 51 in the axial direction. The support plate 52 is disposed at an interval from the base member 34 in the axial direction. The urging member 51 is disposed axially between the base member 34 and the support plate 52. The urging member 51 makes contact at one end thereof with the base member 34 in the axial direction, while making contact at the other end thereof with the support plate 52 in the axial direction. While in a compressed state, the urging member 51 is disposed between the base member 34 and the support plate 52.

The torque limiting part 50 further includes a spacer(s) 53. The spacer(s) 53 has a cylindrical shape. The spacer(s) 53 is disposed axially between the input member 21 and the support plate 52. A rivet(s) 101 fastens the input member 21, the support plate 52 and the spacer(s) 53 together. The spacer(s) 53 reliably produces a space between the input member 21 and the support plate 52 in the axial direction. The base member 34 and the urging member 51 are disposed in the axial space reliably produced by the spacer(s) 53.

The first and second mass bodies 31a and 31b are rotatable relatively to the base member 34. Additionally, the first and second mass bodies 31a and 31b are rotatable about the rotational axis O.

The first and second mass bodies 31a and 32b are formed by stamping of a sheet metal member. The first and second mass bodies 31a and 32b are disposed on both axial sides of the base member 34. In other words, the first mass body 31a is disposed on the engine side of the base member 34, whereas the second mass body 31b is disposed on the transmission side of the base member 34.

Figure 4:
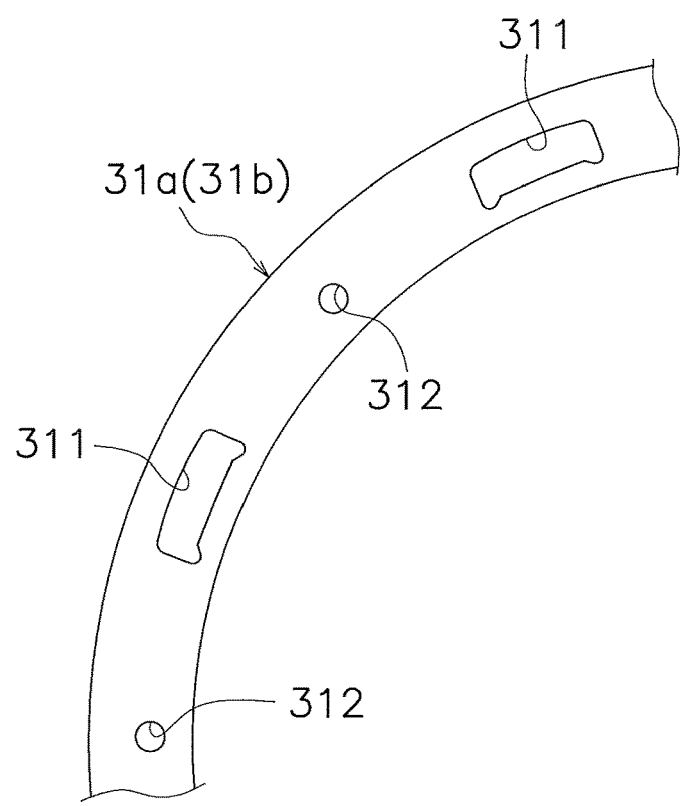
FIG. 4 is an enlarged front view of a mass body.

As shown in FIG. 4, each of the first and second mass bodies 31a and 32b includes a plurality of accommodation parts 311. The respective accommodation parts 311 are disposed at intervals in the circumferential direction. The accommodation parts 311 are disposed in corresponding positions to the accommodation parts 341 of the base member 34, respectively. Additionally, each of the first and second mass bodies 31a and 32b includes through holes 312, each of which is located in a corresponding position to the circumferential middle of each elongated hole 342 of the base member 34.

As shown in FIG. 2, the first lid member 35a has an annular shape and is disposed on the engine side of the first mass body 31a. In other words, the first mass body 31a is interposed and held between the first lid member 35a and the base member 34. As shown close-up in FIG. 5, the first lid member 35a includes through holes 351 in corresponding positions to the through holes 312 of the first mass body 31a.

As shown in FIG. 2, the second lid member 35b is disposed on the transmission side of the second mass body 31b. In other words, the second mass body 31b is interposed and held between the second lid member 35b and the base member 34. As shown close-up in FIG. 5, the second lid member 35b is an annular member. The second lid member 35b includes the through holes 351 in corresponding positions to the through holes 312 of the second mass body 31b.

As shown in FIGS. 2 to 4, each of the plural coil springs 36 is accommodated in each accommodation part 341 of the base member 34, each accommodation part 311 of the first mass body 31a and each accommodation part 311 of the second mass body 31b. Additionally, both ends of each coil spring 36 make contact with the circumferential ends of each accommodation part 341 of the base member 34, those of each accommodation part 311 of the first mass body 31a and those of each accommodation part 311 of the second mass body 31b.

Figure 5:
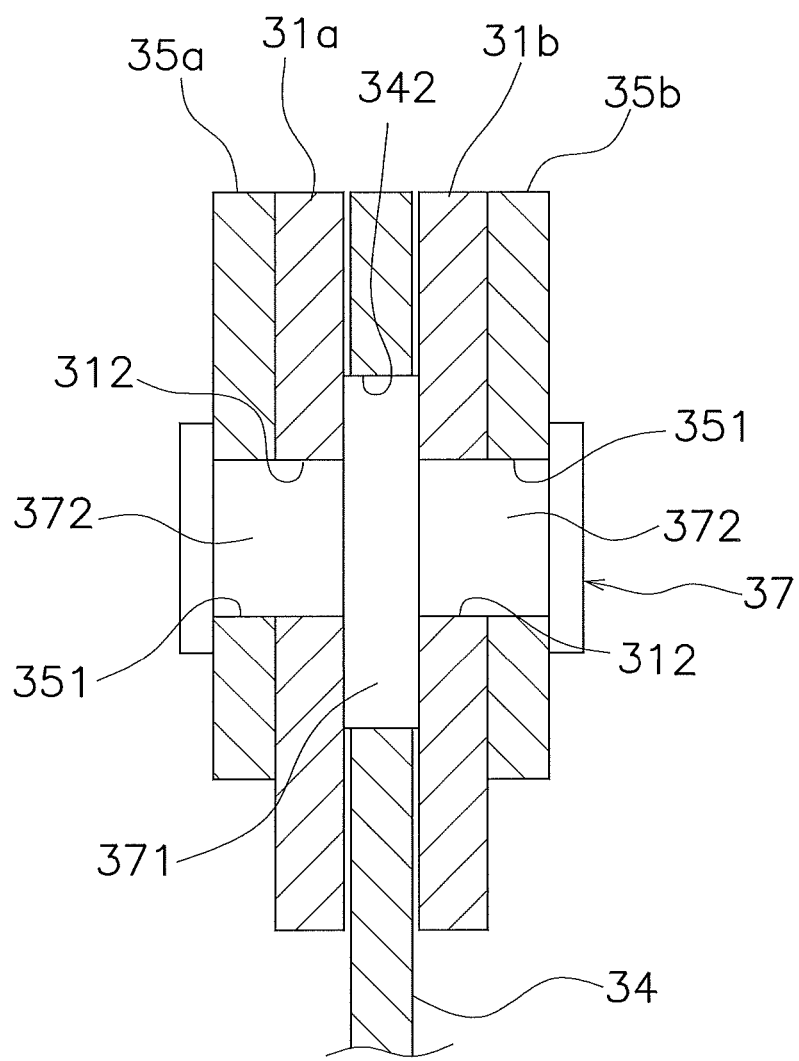
FIG. 5 is an enlarged cross-sectional view of the dynamic vibration absorber.

As shown in FIG. 5, each of a plurality of stop pins 37 includes a large diameter trunk 371 in the axial middle thereof, and includes small diameter trunks 372 on both sides of the large diameter trunk 371.

The diameter of the large diameter trunk 371 is larger than that of each through hole 312 of the first and second mass bodies 31a and 31b and is smaller than that (radial dimension) of each elongated hole 342 of the base member 34. Additionally, the thickness of the large diameter trunk 371 is slightly larger than that of the base member 34.

The small diameter trunks 372 penetrate each through hole 312 of the first mass body 31a, that of the second mass body 31b, each through hole 351 of the first lid member 35a, and that of the second lid member 35b. Additionally, the first and second mass bodies 31a and 31b and both lid members 35a and 35b are fixed to both axial sides of the base member 34 by swaging the heads of the small diameter trunks 372.

With the configuration described above, the base member 34 is rotatable relatively to the first and second mass bodies 31a and 32b and the two lid members 35a and 35b in a range that each stop pin 37 is movable in each elongated hole 342 of the base member 34. Additionally, relative rotation of both is restricted when the large diameter trunk 371 of each stop pin 37 makes contact with one end of each elongated hole 342.

As shown in FIG. 2, the housing 32 is configured to accommodate the first and second mass bodies 31a and 31b. Additionally, the housing 32 accommodates the coil springs 36 and so forth. The housing 32 is attached to the base member 34 by a fastening member(s) 102 such as a rivet(s) or so forth.

The housing 32 is composed of two annular plates 321. The respective annular plates 321 form an internal space. In other words, the respective annular plates 321 are disposed in axial alignment. Additionally, the respective annular plates 321 bulge oppositely to each other, whereby the internal space is formed.

Each annular plate 321 includes an outer peripheral flange 322 in the outer peripheral end thereof. The annular plates 321 are fixed to each other at the outer peripheral flanges 322 thereof by a fastening member(s) 103 such as a rivet(s). In other words, the outer peripheral flanges 322 of the respective annular plates 321 make contact with each other. Additionally, the outer peripheral flanges 322 are fixed to each other by the fastening member(s) 103 penetrating therethrough. It should be noted that the outer peripheral flanges 322 can be fixed to each other by welding or so forth.

Additionally, each annular plate 321 includes an inner peripheral flange 323 in the inner peripheral end thereof. The respective inner peripheral flanges 323 make contact with the base member 34. In other words, the inner peripheral flanges 323 are disposed while interposing the base member 34 therebetween. Moreover, the respective inner peripheral flanges 323 are fixed to the base member 34 by the fastening member(s) 102 penetrating the respective inner peripheral flange 323 and the base member 34. It should be noted that the respective inner peripheral flanges 323 can be fixed to the base member 34 by welding or so forth.

The interior of the housing 32 is filled with the viscous fluid 33. For example, lubricating oil or so forth can be used as the viscous fluid 33.

[Modifications]

One exemplary embodiment of the present advancement has been described above. However, the present advancement is not limited to the aforementioned exemplary embodiment, and a variety of changes can be made without departing from the scope of the present advancement.

Modification 1

Figure 6:
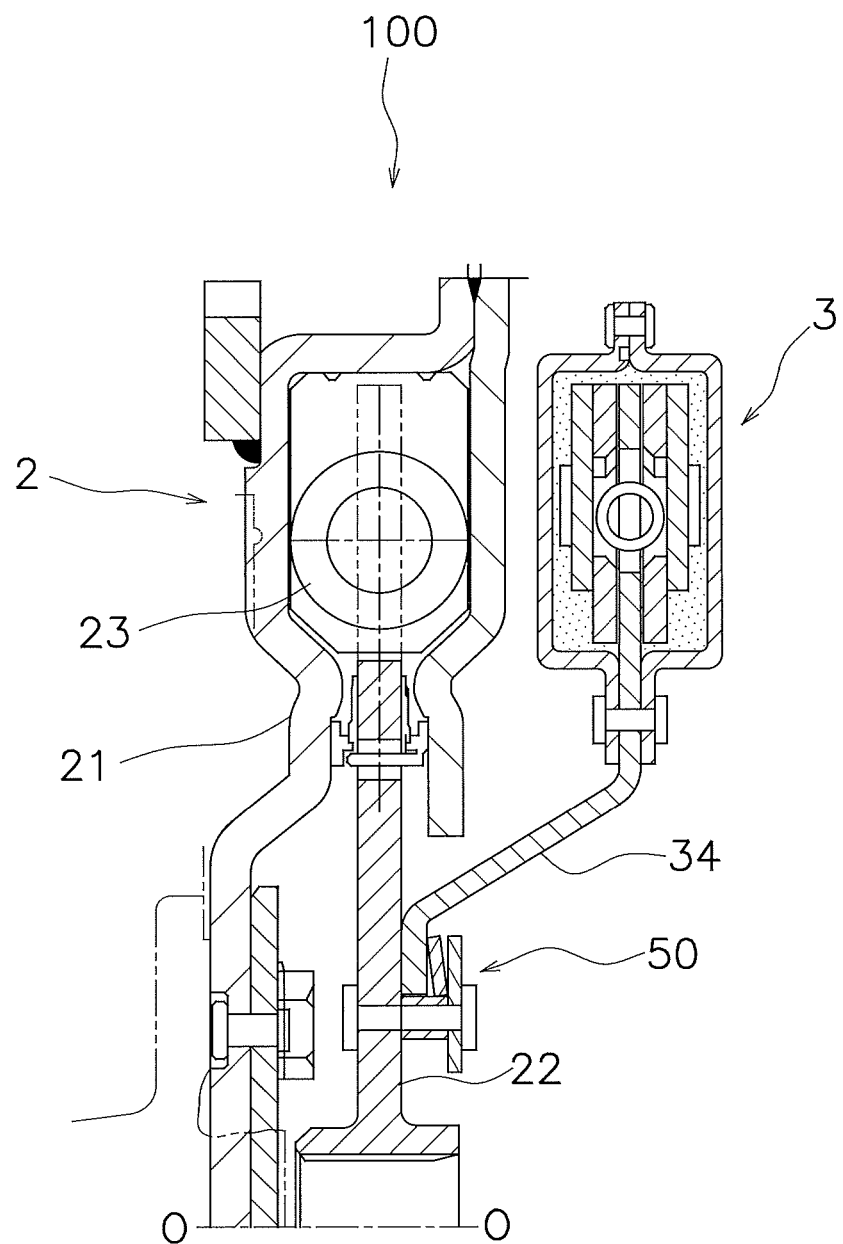
FIG. 6 is a cross-sectional side view of a damper device according to a modification.

In the aforementioned exemplary embodiment, the dynamic vibration absorber 3 is attached to the input member 21 of the damper device body 2. However, the configuration of the damper device 100 is not limited to this. For example, as shown in FIG. 6, the dynamic vibration absorber 3 can be attached to the output member 22 of the damper device body 2. Detailedly, the base member 34 of the dynamic vibration absorber 3 is attached to the output member 22 through the torque limiting part 50.

Modification 2

Alternatively, as shown in FIGS. 7 to 12, the dynamic vibration absorber 3 is attachable to a variety of places of the damper device body 2 through the torque limiting part 50. It should be noted that in FIGS. 7 to 12, the damper device body 2 includes the input member 21, the output member 22, the elastic members 23 and a clutch part 24. The elastic members 23 are provided between the input member 21 and the output member 22, and the input member 21 and the output member 22 are elastically coupled therethrough.

Figure 7:
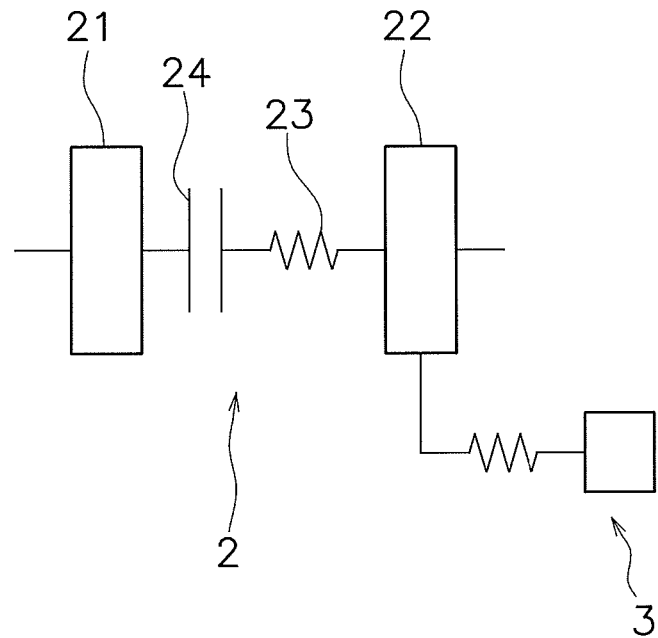
FIG. 7 is a schematic diagram of a damper device according to another modification.

In the damper device body 2 shown in FIG. 7, the clutch part 24 is provided between the input member 21 and the elastic members 23. Additionally, the dynamic vibration absorber 3 is attached to the output member 22.

Figure 8:
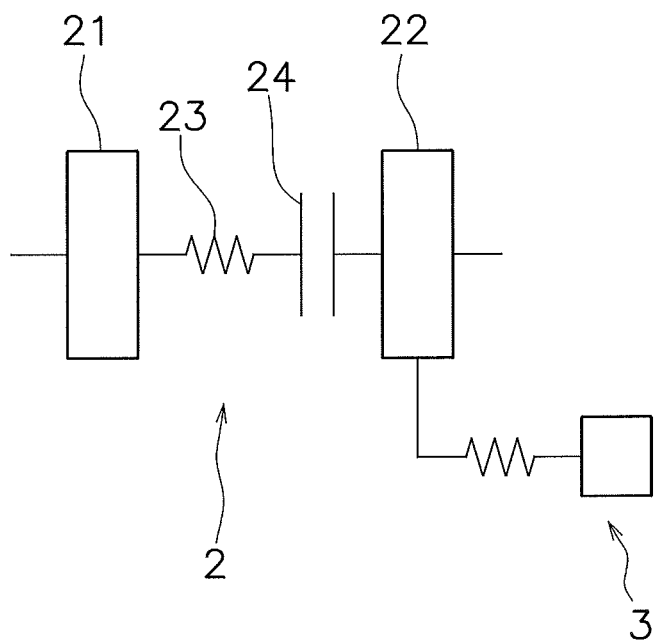
FIG. 8 is a schematic diagram of the damper device according to the another modification.

In the damper device body 2 shown in FIG. 8, the clutch part 24 is provided between the elastic members 23 and the output member 22. Additionally, the dynamic vibration absorber 3 is attached to the output member 22.

Figure 9:
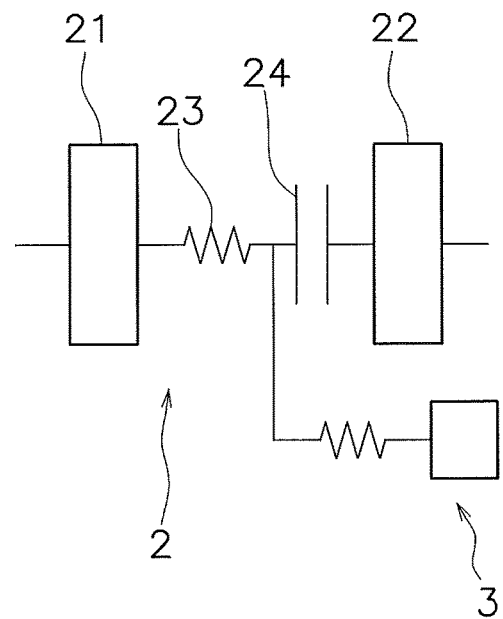
FIG. 9 is a schematic diagram of the damper device according to the another modification.

In the damper device body 2 shown in FIG. 9, the clutch part 24 is provided between the elastic members 23 and the output member 22. Additionally, the dynamic vibration absorber 3 is attached between the elastic members 23 and the clutch part 24.

Figure 10:
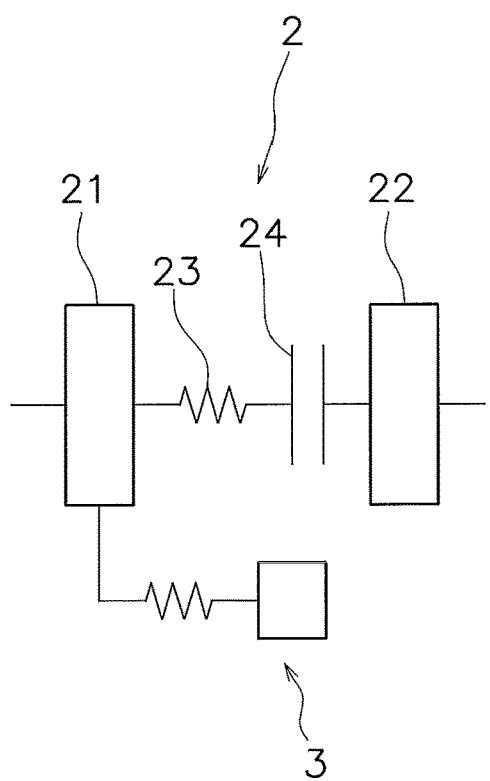
FIG. 10 is a schematic diagram of the damper device according to the another modification.

In the damper device body 2 shown in FIG. 10, the clutch part 24 is provided between the elastic members 23 and the output member 22. Additionally, the dynamic vibration absorber 3 is attached to the input member 21.

Figure 11:
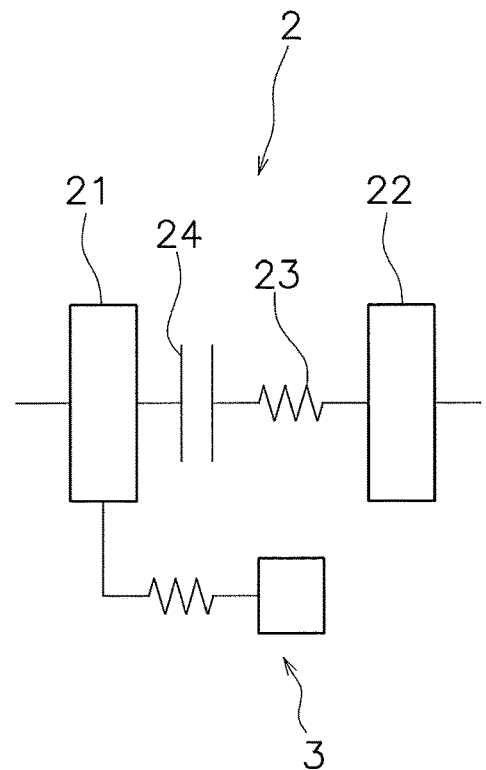
FIG. 11 is a schematic diagram of the damper device according to the another modification.

In the damper device body 2 shown in FIG. 11, the clutch part 24 is provided between the input member 21 and the elastic members 23. Additionally, the dynamic vibration absorber 3 is attached to the input member 21.

Figure 12:
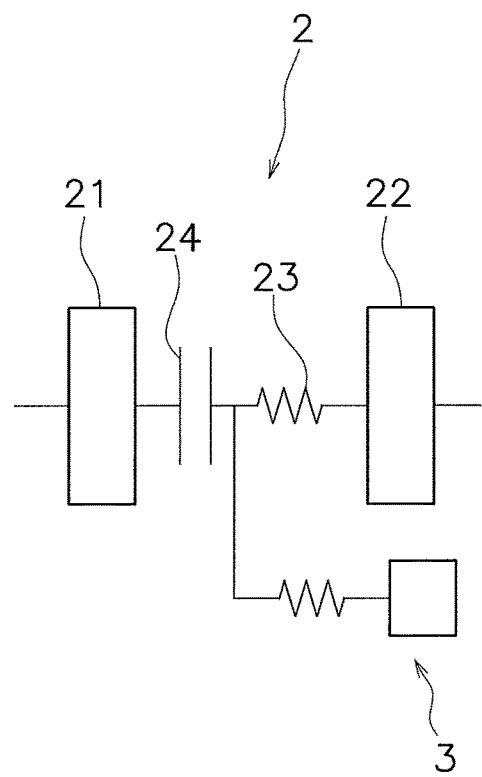
FIG. 12 is a schematic diagram of the damper device according to the another modification.

In the damper device body 2 shown in FIG. 12, the clutch part 24 is provided between the input member 21 and the elastic members 23. Additionally, the dynamic vibration absorber 3 is attached between the clutch part 24 and the elastic members 23.

According to the respective configurations described above, when an excessive torque is inputted into the damper device body 2 in engine starting, the torque limiting part 50 limits transmission of the torque to the base member 34, whereby the damper device body 2 can be effectively prevented from being damaged or broken. On the other hand, when an excessive torque is inputted into the damper device body 2 from the transmission side in sudden braking or so forth, the torque limiting part 50 limits transmission of the torque to the base member 34, whereby the damper device body 2 can be effectively prevented from being damaged or broken.

Modification 3

Figure 13:
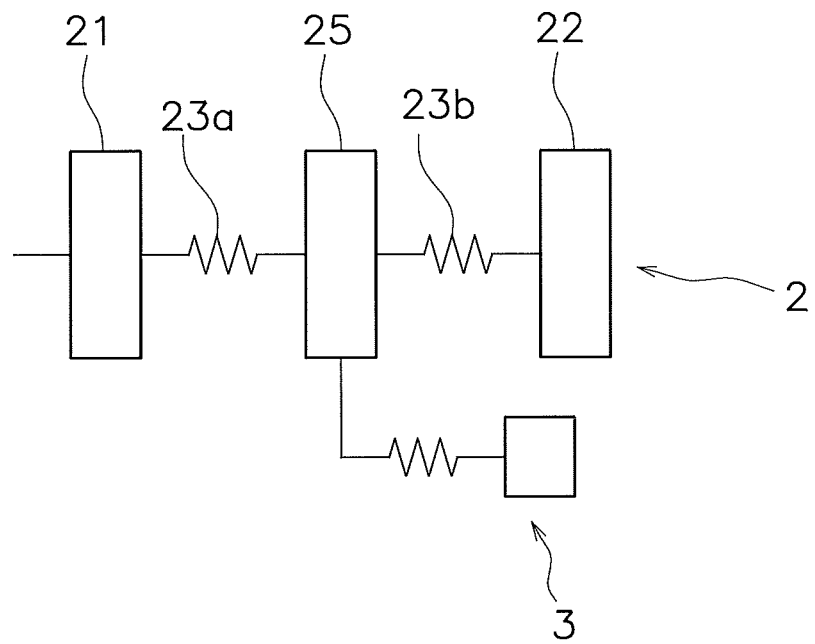
FIG. 13 is a schematic diagram of a damper device according to yet another modification.

As shown in FIG. 13, the damper device body 2 can include the input member 21, the output member 22, a first elastic member 23a, a second elastic member 23b and an intermediate member 25. In this case, the dynamic vibration absorber 3 can be attached to the intermediate member 25. The first and second elastic members 23a and 23b elastically couple the input member 21 and the output member 22. For example, the first elastic member 23a is an outer peripheral side torsion spring disposed on the outer peripheral side, whereas the second elastic member 23b is an inner peripheral side torsion spring disposed on the inner peripheral side. The intermediate member 25 couples the first elastic member 23a and the second elastic member 23b. For example, the intermediate member 25 couples the first elastic member 23a and the second elastic member 23b in series. Additionally, the dynamic vibration absorber 3 is attached to the intermediate member 25.

Modification 4

Figure 14:
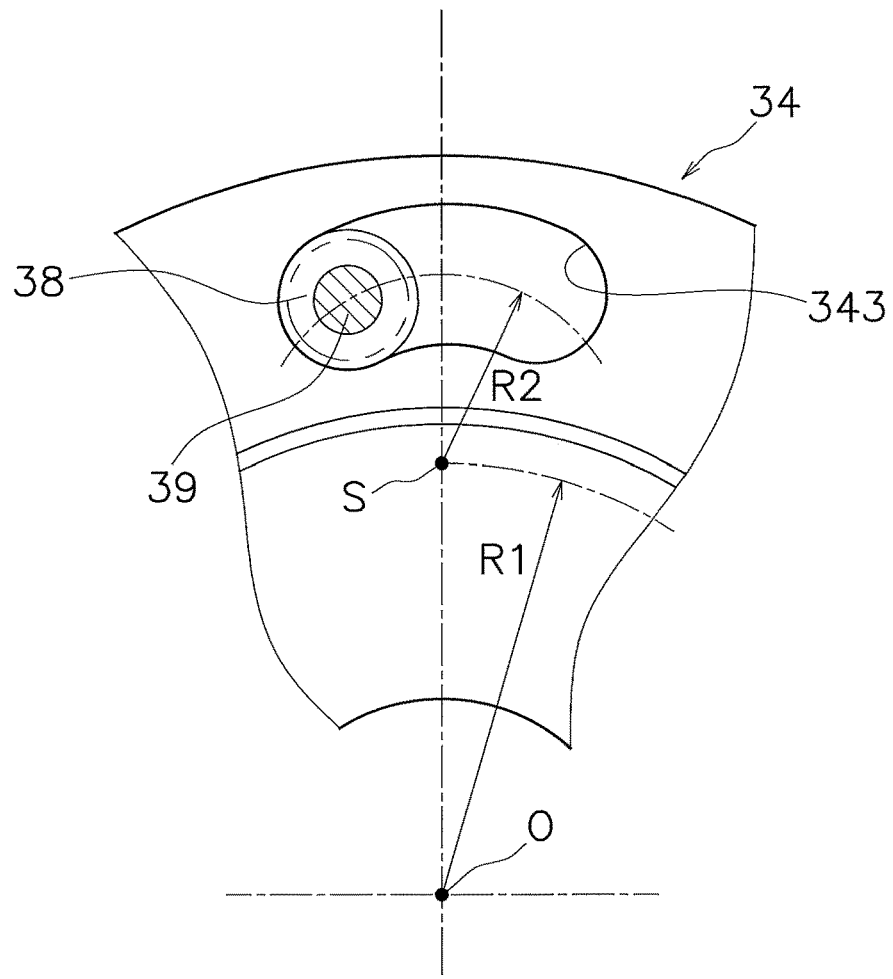
FIG. 14 is an enlarged front view of a dynamic vibration absorber according to further yet another modification.
Figure 15:
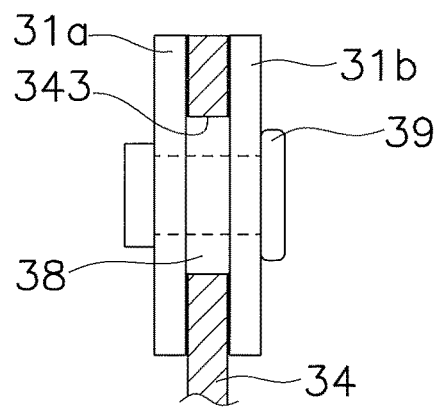
FIG. 15 is a cross-sectional side view of the dynamic vibration absorber according to the further yet another modification.

The configuration of the dynamic vibration absorber 3 is not limited to that of the aforementioned exemplary embodiment. For example, as shown in FIGS. 14 and 15, the first and second mass bodies 31a and 31b of the dynamic vibration absorber 3 can be attached to the base member 34 so as to be capable of swaying in the circumferential direction. Moreover, the dynamic vibration absorber 3 can be configured to attenuate rotational fluctuations by swaying of the first and second mass bodies 31a and 31b. A swaying center S of the respective first and second mass bodies 31a and 31b is disposed in a different position from the rotational axis O of the damper device 100.

Detailedly, the base member 34 includes a slit (s) 343 having a circular-arc shape. The slit 343 is made in the shape of a circular arc with a radius R2 about the point S disposed at a predetermined distance R1 from the rotational axis O of the damper device 100. It should be noted that the slit 343 extends in the rotational direction.

A collar 38 is disposed in the slit 343. The collar 38 has a cylindrical shape. The collar 38 has a diameter smaller than the radial width of the slit 343. Additionally, the collar 38 has a length longer than that of the base member 34. The collar 38 is disposed axially between the first and second mass bodies 31a and 31b. The first mass body 31a, the second mass body 31b and the collar 38 are fixed by a rivet 39. The first and second mass bodies 31a and 31b sway along the slit 343. It should be noted that the housing 32 is not shown in FIGS. 14 and 15 for easy understanding of the drawings.

Modification 5

Figure 16:
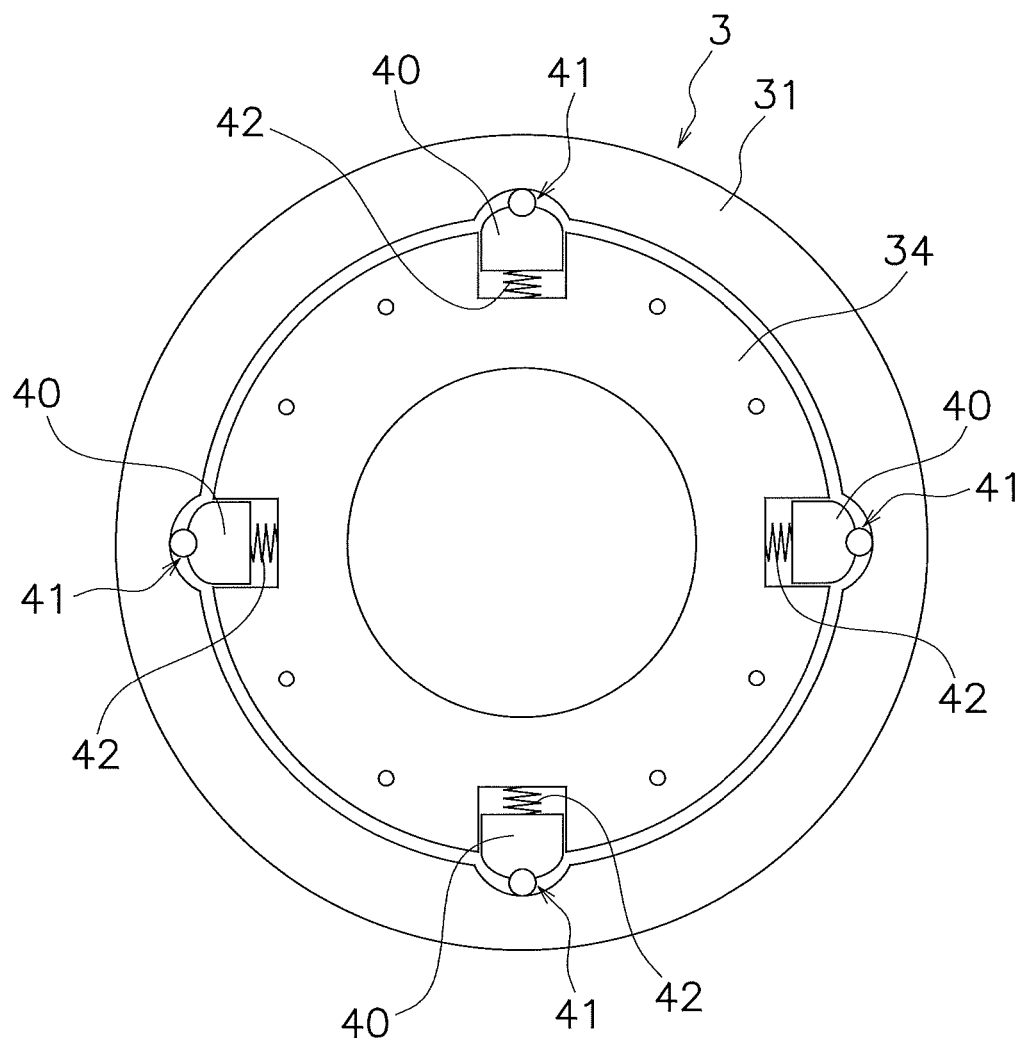
FIG. 16 is a front view of a dynamic vibration absorber according to still further yet another modification.

The configuration of the dynamic vibration absorber 3 is not limited to that of the aforementioned exemplary embodiment. For example, as shown in FIG. 16, the dynamic vibration absorber 3 includes a mass body 31, a plurality of centrifugal elements 40 and a plurality of cam mechanisms 41. Additionally, the dynamic vibration absorber 3 can include a plurality of coil springs 42.

The mass body 31 has an annular shape, for instance, and is disposed radially outside the base member 34. The mass body 31 and the base member 34 are disposed at an interval in the radial direction. It should be noted that the mass body 31 and the base member 34 are disposed in radial alignment. In other words, as seen in the radial direction, the mass body 31 and the base member 34 overlap.

The mass body 31 and the base member 34 are rotated about the rotational axis O. The mass body 31 and the base member 34 are rotatable relatively to each other.

Each centrifugal element 40 is disposed in the base member 34, and is movable radially outside by a centrifugal force generated by rotation of the base member 34. More detailedly, as shown close-up in FIG. 17, the base member 34 includes a plurality of recesses 344 on the outer peripheral surface thereof. Each recess 344 is provided on the outer peripheral surface of the base member 34 and is recessed in a rectangular shape toward the rotational center disposed on the inner peripheral side. Additionally, each centrifugal element 40 is inserted into each recess 344 so as to be movable in the radial direction. For example, each centrifugal element 40 and each recess 344 are provided such that a friction coefficient between the lateral surface of each centrifugal element 40 and each recess 344 is set to be less than or equal to 0.1. Additionally, each centrifugal element 40 is a plate having approximately the same thickness as the base member 34, and includes an outer peripheral surface 401 having a circular-arc shape. Additionally, each centrifugal element 40 includes a roller accommodation part 402 recessed inside from the outer peripheral surface 401.

Each cam mechanism 41 is composed of each of a plurality of rollers 411 as cam followers and each of a plurality of cams 412 provided on the inner peripheral surface of the mass body 31. Each roller 411 is attached to the roller accommodation part 402 of each centrifugal element 40, and is radially movable together with each centrifugal element 40. It should be noted that each roller 411 can be rotatable in or fixed to the roller accommodation part 402. Each cam 412 is a circular-arc surface with which each roller 411 makes contact. When the base member 34 and the mass body 31 are rotated relatively to each other within a predetermined angular range, each roller 411 is moved along each cam 412.

When rotational phase difference is produced between the base member 34 and the mass body 31 by the contact between each roller 411 and each cam 412, a centrifugal force generated in each centrifugal element 40 and each roller 411 is converted into a force directed in the circumferential direction to reduce the rotational phase difference.

Each coil spring 42 is disposed between the bottom surface of each recess 344 and the radially inner surface of each centrifugal element 40, and urges each centrifugal element 40 radially outside. Each centrifugal element 40 and each roller 411 are pressed onto each cam 412 of the mass body 31 by the urging force of each coil spring 42. Therefore, each roller 411 makes contact with each cam 412 even when a centrifugal force does not act on each centrifugal element 40 in a condition that the base member 34 is not rotated.

[Actuation of Cam Mechanisms 41]

Figure 17:
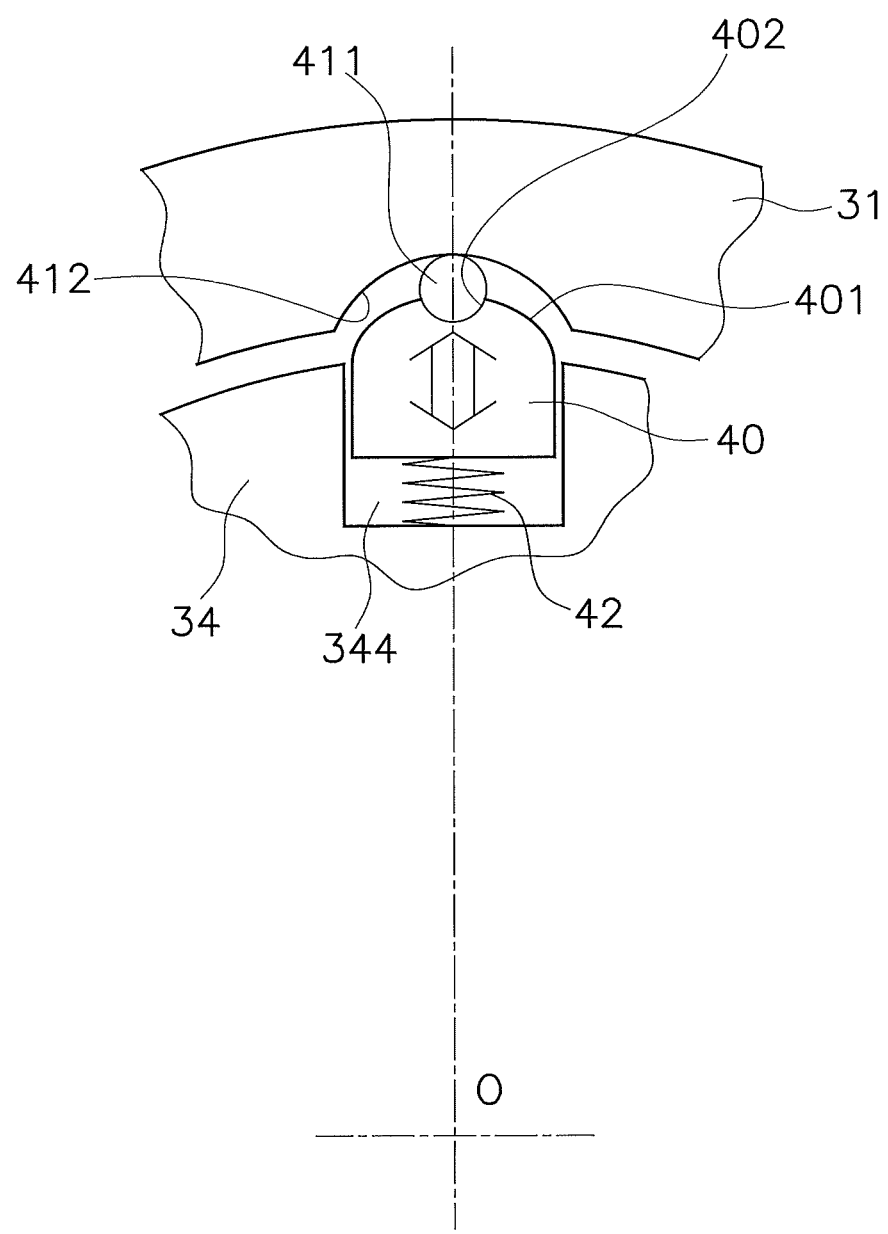
FIG. 17 is an enlarged front view of the dynamic vibration absorber according to the still further yet another modification.

Actuation of each cam mechanism 41 (inhibition of torque fluctuations) will be explained with FIGS. 17 and 18.

A torque transmitted to the damper device body 2 is transmitted to the base member 34 when the value thereof is less than a predetermined threshold. When torque fluctuations do not exist in torque transmission, the base member 34 and the mass body 31 are rotated in the condition shown in FIG. 17. In other words, each roller 411 of each cam mechanism 41 makes contact with the deepest position (circumferential middle position) on each cam 412, and rotational phase difference between the base member 34 and the mass body 31 is "0".

As described above, the rotation-directional relative displacement between the base member 34 and the mass body 31 is referred to as "rotational phase difference". In FIGS. 17 and 18, these terms indicate displacement between the circumferential middle position of each centrifugal element 40 and each roller 411 and that of each cam 412.

Figures 18A, 18B:
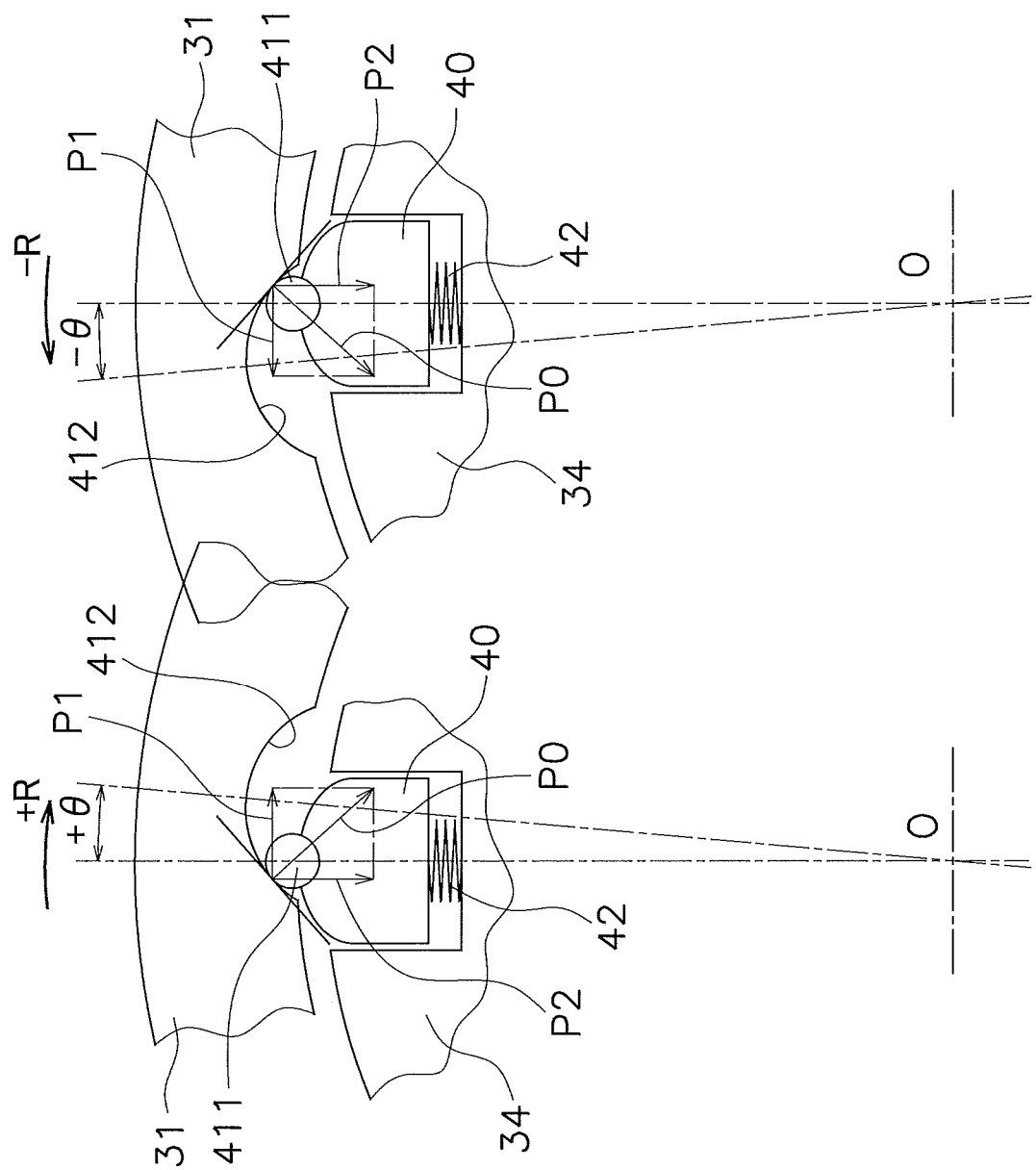
FIGS. 18(a) and 18(b) are diagrams for explaining actions of the dynamic vibration absorber.

On the other hand, when torque fluctuations exist in torque transmission, rotational phase difference ±θ is produced between the base member 34 and the mass body 31 as shown in FIGS. 18(*a*) and 18(*b*). FIG. 18(*a*) shows a condition that rotational phase difference +θ is produced to a +R side, whereas FIG. 18(*b*) shows a condition that rotational phase difference −θ is produced to a −R side.

As shown in FIG. 18(*a*), when the rotational phase difference +θ is produced between the base member 34 and the mass body 31, each roller 411 of each cam mechanism 41 is relatively moved along each cam 412 to the left side in FIG. 18(*a*). At this time, a centrifugal force acts on each centrifugal element 40 and each roller 411. Hence, a reaction force to be received by each roller 411 from each cam 412 has a direction and a magnitude indicated by P0 in FIG. 18(*a*). A first force component P1 and a second force component P2 are produced by the reaction force P0. The first force component P1 is directed in the circumferential direction, whereas the second force component P2 is directed to move each centrifugal element 40 and each roller 411 toward the rotational center.

Additionally, the first force component P1 acts as a force to move the base member 34 to the rightward in FIG. 18(*a*) through each cam mechanism 41. In other words, a force directed to reduce the rotational phase difference between the base member 34 and the mass body 31 acts on the base member 34. On the other hand, the second force component P2 moves each centrifugal element 40 and each roller 411 to the radially inner peripheral side against the urging force of each coil spring 42.

FIG. 18(*b*) shows a condition that the rotational phase difference −θ is produced between the base member 34 and the mass body 31. FIG. 18(*b*) is similar to FIG. 18(*a*) regarding the actuation of each cam mechanism 41, although FIG. 18(*b*) is different from FIG. 18(*a*) only regarding the moving direction of each roller 411 of each cam mechanism 41 and the directions of the reaction force P0, the first force component P1 and the second force component P2.

As described above, when rotational phase difference is produced between the base member 34 and the mass body 31 by torque fluctuations, the base member 34 receives a force (the first force component P1) directed to reduce the rotational phase difference between both by the centrifugal force acting on each centrifugal element 40 and the action of each cam mechanism 41. Torque fluctuations are inhibited by this force.

The aforementioned force inhibiting torque fluctuations varies in accordance with the centrifugal force, in other words, the rotation speed of the base member 34, and also varies in accordance with the rotational phase difference and the shape of each cam 412. Therefore, by suitably setting the shape of each cam 412, characteristics of the damper device 100 can be made optimal in accordance with the specification of the engine and so forth.

For example, each cam 412 can be made in a shape that makes the first force component P1 linearly vary in accordance with the rotational phase difference in a condition where the centrifugal force acting is constant. Alternatively, each cam 412 can be made in a shape that makes the first force component P1 non-linearly vary in accordance with the rotational phase difference.

REFERENCE SIGNS LIST

3 Dynamic vibration absorber
31*a*, 31*b* Mass body
32 Housing
33 Viscous fluid
34 Base member
40 Centrifugal element
41 Cam mechanism

The invention claimed is:
1. A dynamic vibration absorber configured to be attached to a damper device body, the dynamic vibration absorber comprising:

a base member rotatably disposed, the base member having an inner peripheral end and an outer peripheral end disposed axially farther from the damper device body than the inner peripheral end;

a mass body attached to the base member so as to be rotatable relative thereto; and a torque limiting part attached to the inner peripheral end of the base member, the torque limiting part configured to limit transmission of a torque to be inputted into the base member from the damper device body, the torque limiting part being disposed separately from a torque transmission path of the damper device body, and the mass body being attached to the outer peripheral end of the base member such that the entire mass body is disposed axially farther from the damper device body than the torque limiting part.

2. The dynamic vibration absorber according to claim 1, wherein the torque limiting part is configured to rotate the base member unitarily with the damper device body when the torque to be inputted into the base member is less than a threshold, the torque limiting part configured to rotate the base member relatively to the damper device body when the torque to be inputted into the base member is greater than or equal to the threshold.

3. The dynamic vibration absorber according to claim 1, further comprising:

a housing attached to the base member, the housing accommodating the mass body; and a viscous fluid filled in the housing.

4. The dynamic vibration absorber according to claim 1, wherein the mass body sways with respect to the base member in a circumferential direction, the mass body having a swaying center, the swaying center arranged in a position different from a rotational center of the base member.

5. The dynamic vibration absorber according to claim 1, further comprising:

a centrifugal element disposed to receive a centrifugal force, the centrifugal force generated by rotation of the base member; and a cam mechanism configured to convert the centrifugal force that acts on the centrifugal element into a force directed in a circumferential direction.

6. The dynamic vibration absorber according to claim 1, wherein the torque limiting part includes an urging member, the urging member configured to urge the base member toward the damper device body.

* * * * *